(12) United States Patent
Bohrer et al.

(10) Patent No.: US 7,478,157 B2
(45) Date of Patent: Jan. 13, 2009

(54) SYSTEM, METHOD, AND BUSINESS METHODS FOR ENFORCING PRIVACY PREFERENCES ON PERSONAL-DATA EXCHANGES ACROSS A NETWORK

(75) Inventors: Kathryn A. Bohrer, Austin, TX (US); Catherine A. Chess, Ossining, NY (US); Robert L. Hoch, Wilton, CT (US); John Karat, Greenwich, CT (US); Dogan Kesdogan, White Plains, NY (US); Xuan Liu, Yorktown Heights, NY (US); Edith G. Schonberg, New York, NY (US); Moninder Singh, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 1600 days.

(21) Appl. No.: 10/046,034

(22) Filed: Nov. 7, 2001

(65) Prior Publication Data

US 2003/0088520 A1   May 8, 2003

(51) Int. Cl.
G06F 15/173 (2006.01)
(52) U.S. Cl. .................. 709/226; 709/223; 709/224; 709/225; 726/1; 726/26; 726/27
(58) Field of Classification Search .......... 709/200, 709/203, 223–226, 229; 726/4–7, 1, 26–30; 707/9, 10; 705/50, 60, 74, 64
See application file for complete search history.

(56) References Cited

U.S. PATENT DOCUMENTS

| | | | |
|---|---|---|---|
| 6,253,203 B1 * | 6/2001 | O'Flaherty et al. | 707/9 |
| 6,275,824 B1 * | 8/2001 | O'Flaherty et al. | 707/9 |
| 6,480,850 B1 * | 11/2002 | Veldhuisen | 707/9 |
| 2001/0054155 A1 * | 12/2001 | Hagan et al. | 713/193 |
| 2002/0010784 A1 * | 1/2002 | Clayton et al. | 709/229 |
| 2002/0029254 A1 * | 3/2002 | Davis et al. | 709/217 |
| 2002/0087472 A1 * | 7/2002 | Walter | 705/41 |
| 2002/0091741 A1 * | 7/2002 | Ferreira et al. | 707/530 |

OTHER PUBLICATIONS

Microsoft .Net My Services pp. 1-11.
Novell. Digitalme Making Life Easier on the Net pp. 1-3.

(Continued)

*Primary Examiner*—Saleh Najjar
*Assistant Examiner*—Faruk Hamza
(74) *Attorney, Agent, or Firm*—F. Chau & Associates, LLC

(57) ABSTRACT

An exemplary embodiment of the present invention includes a method to enforce privacy preferences on exchanges of personal data of a data-subject. The method comprises the steps of: specifying data-subject authorization rule sets having subject constraints, receiving a request message from a requester and a requester privacy statement, comparing the requester privacy statement to the subject constraints, and releasing the data-subject data in a response message to the requester only if the subject constraints are satisfied. The requester privacy statement includes purpose, retention, recipient, and access information, wherein the purpose information specifies the purpose for which the requested data is acquired, the retention information specifies a retention policy for the requested data, the recipient information specifies the recipients of the requested data, and the access information specifies whether the requested data should be accessing to the data-subject after the data has been released.

19 Claims, 11 Drawing Sheets

OTHER PUBLICATIONS

Lumeria—SuperProfile. What is a Superprofile pp. 1.
Zeroknowledge—Freedom Internet privacy and Security Software pp. 1-3.
Brodia Personal Commerce Manager pp. 1.
PentaSafe Security Technologies, Inc. pp. 1-4.
Persona—(p)-CRM Internet Marketing Platform pp. 1.
PrivacyRight Products pp. 1.
IDcide—PrivacyWall Site Analyzer pp. 1-2.
IDcide—PrivacyWal Site Monitor pp. 1-2.
Tivoli Privacy Manager pp. 1-2.

* cited by examiner

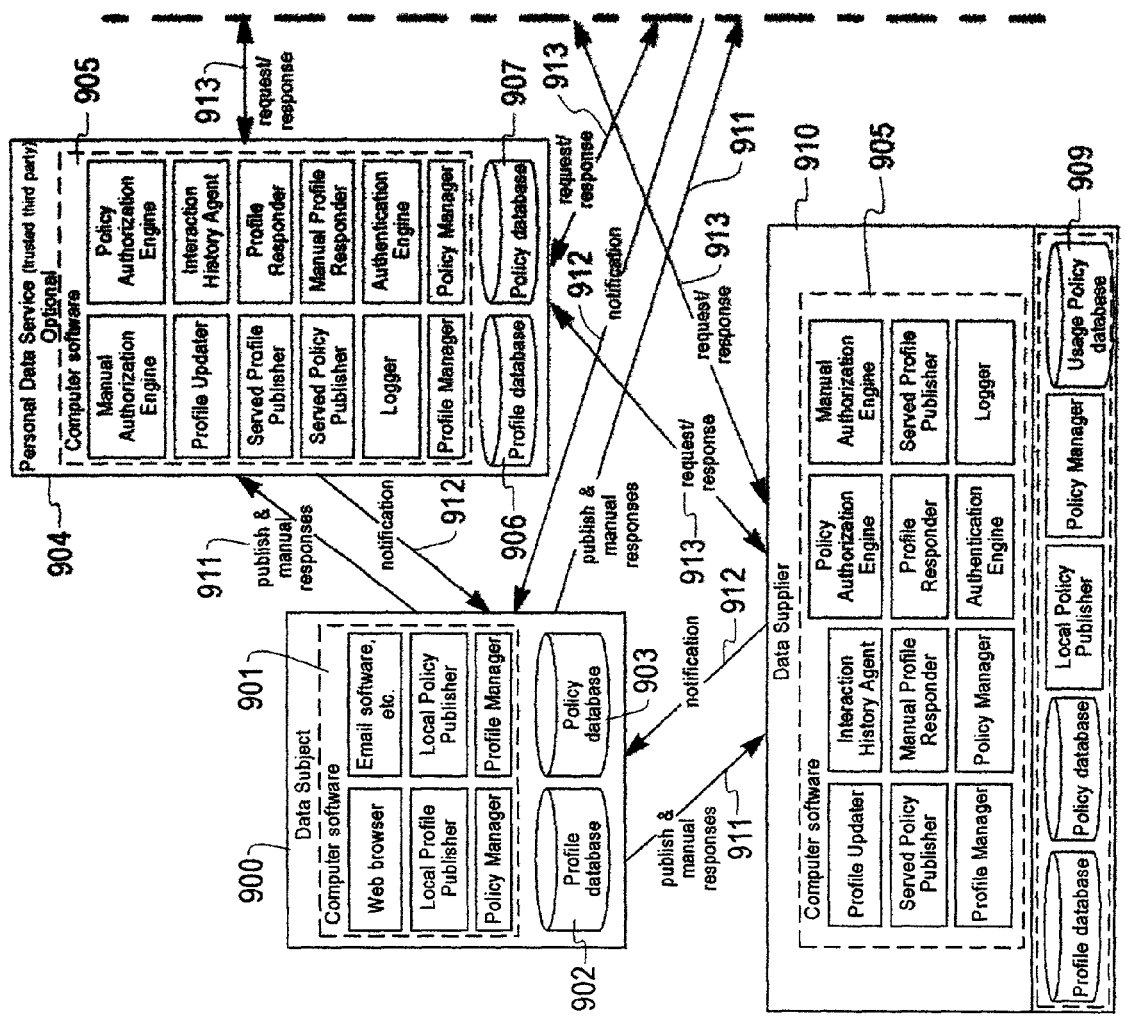

SYSTEM, METHOD, AND BUSINESS METHODS FOR ENFORCING PRIVACY PREFERENCES ON PERSONAL-DATA EXCHANGES ACROSS A NETWORK

FIELD OF THE INVENTION

This invention relates generally to privacy for information handling across a network. More specifically, the invention relates to methods, systems and business methods to enforce privacy preferences on exchanges of personal data across a network.

BACKGROUND

Many approaches to handling privacy preferences during personal data exchanges have been proposed in the past. These approaches can generally be divided into several product and technology areas: personal e-wallet/data vault products, enterprise specific e-wallet/data vault products, personal privacy enforcing agents, enterprise policy development, enterprise policy enforcing private data management, and enterprise privacy-enhancing data manipulation. The function of each of these is described briefly in the subsequent sections.

Various Personal e-Wallet and Data Vault products and services provide the ability to store, and sometimes share, personal information. Often, tools are provided, usually as a browser plug-in, to allow users to drag and drop from their stored data onto web forms while browsing. In some cases the web site's privacy policy is compared to the consumer's policy preferences and warnings are issued when there is a mismatch. Privacy policies are often based on the Platform for Privacy Preferences or P3P standard. Examples of such products include Microsoft's Internet Explorer and Passport service, Novell's digitalMe, Lumeria's SuperProfile and ZeroKnowledge's Freedom. Microsoft's Hailstorm service is an extension to its Passport service that provides data subject's a repository to store their personal data, and allows the data subject to grant permission to third party services and applications to access that data. The data subject has to give explicit access to third parties to access the data, and limited amount of privacy control is provided in that the data subject can specify who can access the data, for what purpose and revoke access or give access for a limited period of time.

Current Personal Policy Enforcing products are designed to support a user's privacy policy preferences. A few of the e-wallet/data vault products provide some of this functionality, but the products listed here focus on allowing a complex privacy policy to be represented and checked against either a web site's privacy policy or a data requester's privacy policy. These products use a P3P Preference Exchange Language or APPEL as a language to express what P3P policies are acceptable. Agents retrieve the P3P policies associated with a web site and compare them to the APPEL rules. Mismatches result in warnings to the user. The user then takes whatever action they deem appropriate, such as not filling out the web site form. Examples of these agents are the AT&T Privacy Minder and the IBM Privacy Assistant.

Enterprise Policy development tools help an enterprise develop their privacy policy and publish it on their web sites. These tools generally help in identifying personal information in databases and web pages, and help in creating a policy statement. Examples of such tools include the PentaSafe VigiEntPolicy Center, the IBM P3P policy editor, and Idcide Privacy Wall Site Analyzer. Policies are expressed as free form text and/or P3P XML documents.

Enterprise Policy Enforcing Private Data Management products are designed for enterprises to control or monitor access to personal data stored within the enterprise, according to the enterprise's privacy policies. Some of the products focus on support for privacy regulations, some provide both the data repositories and the policy enforcement, while some provide only policy enforcement. Some of the products are out-sourced services while others are technology used to implement in-house solutions. These products are generally access control systems enhanced to allow more permissions specifically for different usages that are covered by the enterprise privacy policies. Permissions are associated with different authenticated users or lists of users that request access to data. Examples of such products include Privaseek Persona p-CRM, PrivacyRight TrustFilter Privacy and Permission Management for the Enterprise, Tivoli SecureWay Privacy Manager, and Idcide Privacy Wall Site Monitor.

Standards have also been developed that promote the exchange of data over the internet as well as through non-internet messaging systems. The Customer Profile Exchange Specification or CPExchange is a standard that defines how a P3P policy can be associated with personal data in an XML message. This policy applies to the data being provided by one party to another, and provides a way for an enterprise to include the applicable privacy policy with personal data exchanged between applications or between organizations.

Enterprise Privacy-enhancing Data Manipulation tools and technologies are used to eliminate privacy issues by transforming data so it is no longer personally identifiable, or to operate on data and produce results that are not personally identifiable. Data mining for trend analysis or targeted marketing can often benefit from these products. These products may be offered as out-sourced services or technology for in-house solutions. Examples are Privacy Infrastructure Inc. AsPrin, IBM Intelligent Miner Family, and ETI*Extract. All of these except the first one are not privacy specific, but are general tools for data analysis and transformation.

However, the above-mentioned examples have several limitations which are addressed by the current invention. These limitations are discussed in detail in the following paragraphs.

One major limitation is that current products assume that a data subject owns all personal data and/or all this data is available in one central repository or enterprise. However, a data subject's personal data is distributed across many enterprises and repositories, and it is not practical to expect all this data to be collected in one central repository, or to be owned by one enterprise or even the data subject. Each enterprise owns some of the personal data they generate about a data subject, such as financial information in a bank, or health information in a hospital. Thus, a data subject's financial data may be held/owned by several enterprises such as his bank, credit card providers and broker, while his employment data is held by his employer and his health information is held by his doctors and health insurance providers. At the same time, the data subject has various other personal data, such as current phone numbers, addresses, clothing preferences, and a wide range of other preferences. None of the current products deal with allowing a data subject to express privacy preferences for controlling access to their personal data that is distributed across multiple enterprises and repositories. While enterprises often offer data subjects an "opt-out" policy by which the data subject can explicitly choose to allow or disallow the enterprise from sharing his data, this is an extremely limiting kind of privacy control since it imposes the policy of the enterprise on the data subject, with little or no capability to express policies specific to each data subject (other than the opt-out/opt-in option to some portion of the enterprise's policy). However, data subjects want complete freedom to specify their own privacy preferences (and not the data owner's or data holder's) on how their personal data is handled, regardless of where that data is stored or who owns that data.

Moreover, the current products that do store a data subject's preferences do so in a limited way, often based on P3P privacy declarations. These are aimed at use in a situation made clear to the data subject by the context of the request. However, a data subject should be able to express complex privacy preferences that include who can access data, what set of data or type of data they can access, for what purpose the access is granted, how long the data can be retained, who the data can be shared with and for what purposes, and whether the data must subsequently be accessible to the data subject. For example, current systems may allow specification of a policy to be associated with the "current purpose", but there is no way to apriori state a policy for different business transactions like "placing an order", "requesting information", "applying for a loan", etc. for the prescribed purposes. Moreover, current systems will apply the same policy to all data exchanges with a given data requester. However, data subjects often need much more flexibility than is allowed by these current systems. For example, a data subject may choose to allow access to different sets of data, with different policies on usage and sharing, for different requests made by the same data requester, based on the context of the request.

Another feature which is missing in current products is the capability to enforce a data subject's policy even when the data subject is not directly involved. This is necessary if a data subject's privacy policy is to be followed in all business processing. Most of the current personal privacy enforcement products only assist the data subject in filling in a form on a web page with stored data, or in comparing the data subject's privacy preferences with a web page privacy policy and providing warnings to the data subject. This requires the data subject to be online and actively involved in providing the data that is being requested. Others always require a data subject to give explicit approval once to a requester for accessing certain data owned by the data-subject, with subsequent requests being, possibly, handled automatically. However, a data subject may want to setup privacy preference policies which can allow fully automatic release of data, even without knowing about the requester or the request itself. Moreover, one would like to do so even for data that is held/owned by third parties. For example, a data subject may decide to allow access to non-identifying employment data such as work experience, salary range, etc., to anyone who requests such data as long as the privacy policy governing use, retention etc., match those of the data subject. That would enable any interested party to access such data about the data subject automatically via an automatic privacy policy matching process and send the data subject job listings in which the data subject may have interest. Similarly, a data subject may allow access to certain, non-identifiable financial data such as employment status and salary range, thus enabling interested financial institutions to automatically access such data and send solicitations for credit cards/loan requests to the data subjects. Current products lack this feature as well.

Yet another limitation of current products is the inability for data subjects to be able to easily express complex policies on a large set of personal data, in a way that is applicable regardless of the specific representation and data model used by enterprises that store this data. This is important since, as point out above, a data subject's data will be distributed across multiple enterprises and repositories. One way to facilitate this is by supporting an abstract data model, supporting a data type hierarchy, and by grouping data into levels within multiple views. Policies can then be applied at different granularities, to either views or levels within views, with the views themselves described by using both data types and data instances, such as, for example, all phone numbers or just the data subject's cell phone number. Current products do not have this kind of flexibility.

These limitations, along with public concern regarding privacy of personal data, make it highly desirable for systems and methods for enforcing privacy preferences on personal data exchanges across networks.

BRIEF SUMMARY

An exemplary embodiment of the present invention includes a method to enforce privacy preferences on exchanges of personal data of a data-subject. The method comprises the steps of: specifying one or more data-subject authorization rule sets, the data-subject authorization rule set having one or more subject constraints on one or more data-subject data, receiving a request message from a requester, the request message having one or more requests for one or more of the data-subject data pertaining to the a subject, and a requester privacy statement for each of the respective data-subject data requested, comparing the requester privacy statement to the subject constraints, and releasing the data-subject data in a response message to the requester only if the subject constraints are satisfied. The requester privacy statement includes purpose, retention, recipient, and access information, wherein the purpose information specifies the purpose for which the requested data is acquired, the retention information specifies a retention policy for the requested data, the recipient information specifies the recipients of the requested data, and the access information specifies whether the requested data should be accessible to the data-subject after the data has been released.

BRIEF DESCRIPTION OF THE SEVERAL VIEWS OF THE DRAWINGS

The foregoing and other objects, aspects, and advantages will be better understood from the following non limiting detailed description of preferred embodiments of the invention with reference to the drawings that include the following.

DETAILED DESCRIPTION

The invention involves the use of computers and networks. It is not limited as to the type of computers used, and not limited as to the type of networks used. Various implementation methods may be used for the present invention. The invention involves information that is communicated between computers; this information could be in hypertext markup language (HTML), or extensible markup language (XML), e-mail, or some other language or protocol could be used.

Figure 1:
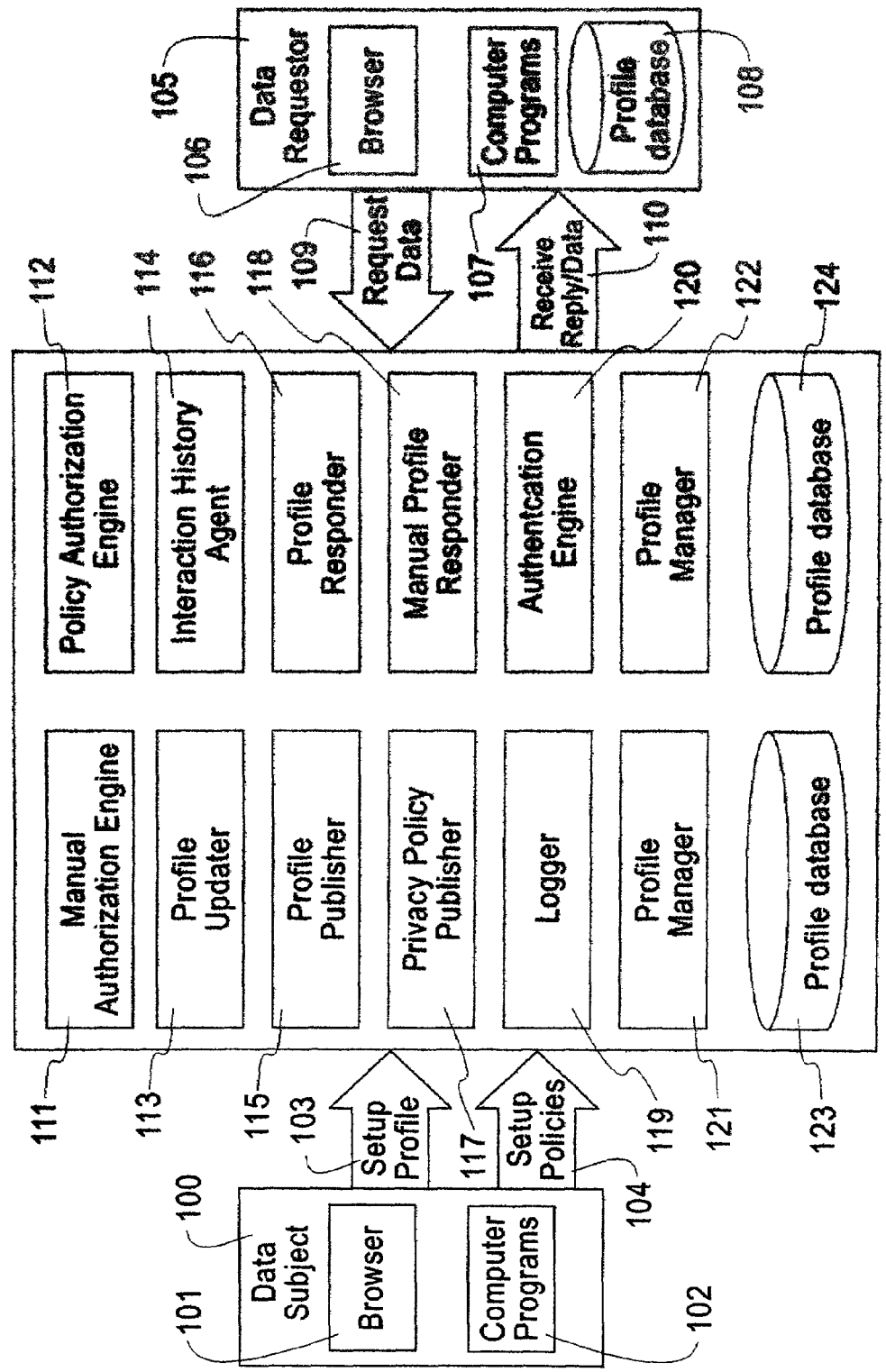
FIG. 1 is a block diagram of one preferred embodiment of present invention.

FIG. 1 is a block diagram illustrating an embodiment of the present invention. This embodiment supports the enforcement of privacy preferences in data exchanges according to authorization checks based on the privacy preferences specified by a data subject with the privacy policies of a data requester.

The Data Subject 100 can use a web browser 101 to setup one or more profiles via communication links 103, such as HTTP requests. Similarly, the Data Subject can use a web browser to set up one or more privacy policies by specifying authorization rules describing to whom, and under what conditions, the data can be released via communication links 104, such as HTTP requests.

Similarly, a Data Requester 105 can use a web browser 106 or some other computer programs 107 to send requests for data 109 as well as receive replies 110 to that request along with any returned data. Each request for data is also accompanied by the data requester's privacy policies describing the intended usages of the requested data. Such policies are stored by the requester in a policy database 108.

To facilitate the requests from a Data Subject to setup data profiles and privacy policies, as well as requests for data from Data Requesters, the system must provide several different functionalities, including the ability to setup profiles, define authorization rules and privacy controls, send and handle requests for data, authenticate requesters, authorize release of data based on authorization rules and privacy policy matching and release data, etc. The embodiment provides these functionalities using a series of software and hardware components 111 to 124, including a manual authorization engine 111, a policy authorization engine 112, a profile updater 113, an interaction history agent 114, a profile publisher 115, a profile responder 116, a privacy policy publisher 117, a manual profile responder 118, a logger 119, an authentication engine 120, a profile manager 121, a policy manager 122, a profile database 123 and a policy database 124. The Profile Manager 121 maintains basic profile information and provides programming interfaces for creating, querying, modifying and deleting profile information. Similarly, the Policy Manager 122 maintains basic policy information and provides programming interfaces for creating, querying, modifying and deleting policy information. The profiles are stored in a Profile Database 123 while the policies are stored in a Policy Database 124.

The Policy Authorization Engine 112 performs automatic authorization for release of requested data based on authorization rules including information about privacy policy information associated with data, templates and request types, as well as users authorized to access the data Privacy policies can be different for different groups of requesters and may also be specified at a data class, data instance, template or request level. Definitions of privacy policies can also include policies on profile data held by third-parties. As such, it also handles requests for authorization for release of personal data held by a third-party, just as if the data was held directly by the current system. The Policy authorization engine also supports the data subject by providing the data requester with an explicit one time authorization for a particular request type as an alternative to privacy policy matching against data and requester class/group. The Authentication Engine 120 authenticates requesters of profile information, authorization or updates.

The Profile Responder 116 receives requests for profile information along with privacy statements on how the data will be used. It uses the Authentication engine 120 to authenticate the requester and uses the Policy authorization engine to check the authorization and privacy policies. It may need to check return from the Policy Authorization engine to see if external authorization is needed on any of the requested data, and handle requests to those external authorization sources. Similarly, it must recognize need for manual authorization and invoke the Manual Authorization Engine 111, if needed. It uses the Profile and Policy Managers to get only the subset of information that is allowed by the policy checks and uses the Logger component to record the request and the response. It also checks data returned by the query on the Policy Authorization engine 112 to see if some data needs to be obtained from an external source, and handles requests to those external sources. It also verifies and filters the response to ensure that no unauthorized data is returned. This step may not be necessary if queries for the exact allowed and requested data are used and supported. However, it may not be possible to trust external sources to return only the requested data since the query might return a larger set of data than the policies allow or was requested. Finally, it also supports requests for only authorization of release of data, and uses the Policy Authorization engine to return information on the data that is authorized for release under the requested policy.

The Manual Authorization Engine 111 provides the ability to perform manual authorization of a portion of the requested data. Invoked by the Profile Responder (or possibly the Policy Engine) to initiate a manual authorization, it sends an e-mail or otherwise notifies the data provider of the need for manual authorization. The data subject can use various computer programs 102, such as e-mail software, to respond to such a request.

The Profile Updater 113 receives requests to create, delete, or modify profile information. Like the Profile Responder, this component must authenticate the requester, log the request and response, check for authorization to make the profile update, and update the profile information.

The Interaction History Agent 114 provides support for user specification of what actions should be intercepted. This could be stored in the form of rules or explicit action types. An intermediary or proxy can then be used to intercept the desired online actions and record them as additional profile data.

The Profile Publisher 115 and the Privacy Policy Publisher 117 provide the user interfaces for specifying authorization information, privacy policies, profile data and templates. They can use the Profile and Policy Managers for reading and writing the information, or could go more indirectly through the Profile Updater and Profile Responder components.

The Manual Profile Responder 118 provides the user interfaces for gathering missing data in order to fulfill a profile data request. Invoked by the Profile Responder (or possibly the Profile Manager) to initiate entry of missing requested profile data. Sends an e-mail or otherwise notifies data provider for missing data entry. The e-mail can provide an easy way to launch a browser-based user interface to specify the needed data.

The Logger 119 supports logging of requests to and responses by the system, and uses the Profile Manager to make any updates to the profile.

In one embodiment, the Data Subject sets up data profiles and privacy policies using the Profile Publisher and the Privacy Policy Publisher. These would be stored in the Profile and Policy database, respectively. A Data Requester sends a request for data describing the data desired along with privacy policies describing the intended usage. The request is handled by the Profile Responder which uses the Authentication engine to verify the identity of the requester and the Policy Authorization engine to check the authority of the requester to access the requested data by using authorization rules and privacy policies, possibly invoking the Manual Authorization engine (to get manual authorizations). It then gathers the authorized data (possibly invoking the Manual Profile Responder to get missing data from the data subject), logs the request and reply using the Logger, updates the profile with this information using the Interaction History Agent, and send a reply along with the data to the data requester.

While the system described in FIG. 1 is capable of executing the processes described herein, this system is only one example of such a system. Those skilled in the art will appreciate that many other system designs are capable of performing the processes described herein.

Figure 2:
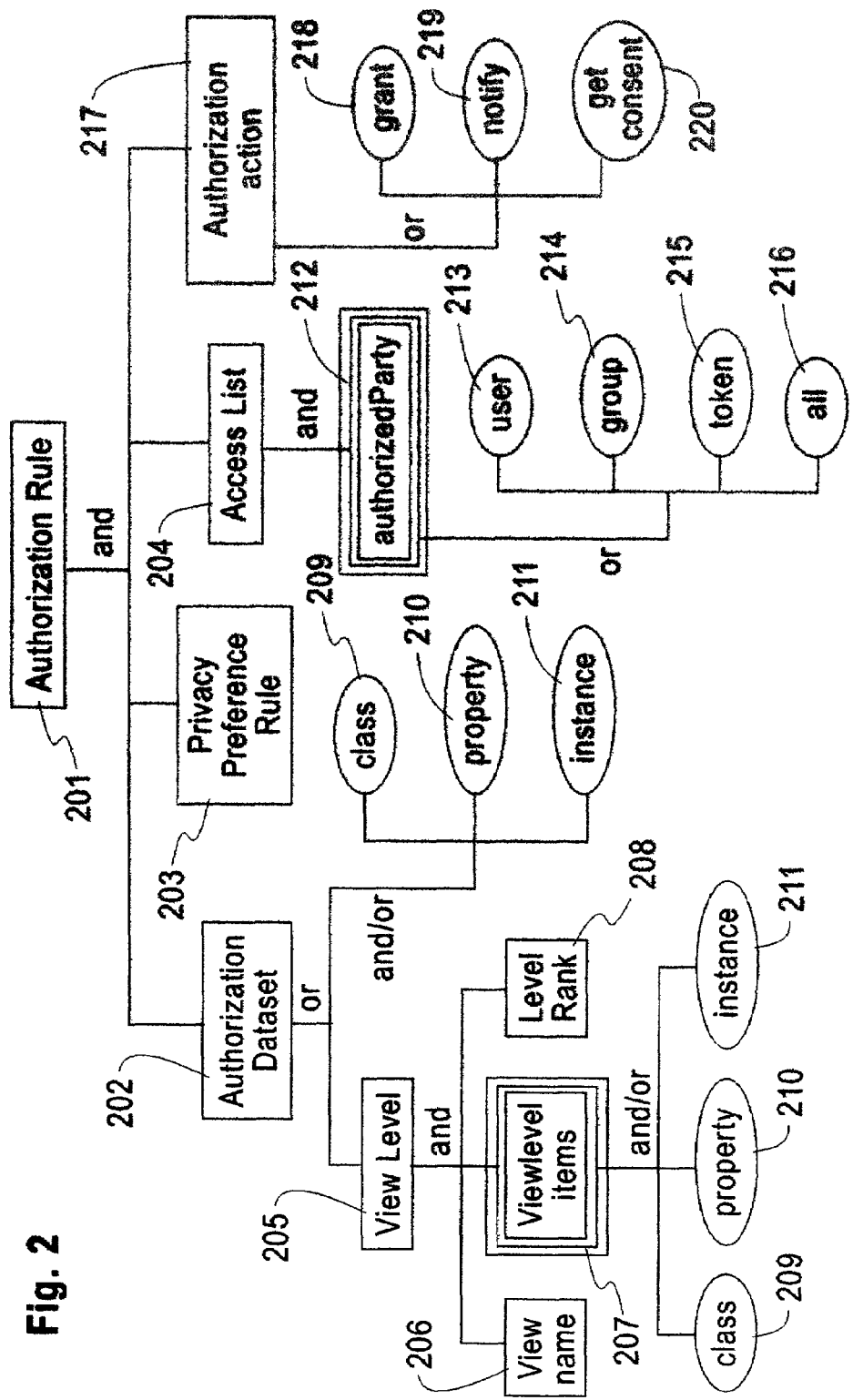
FIG. 2 is a block diagram of a rule data structure.

FIG. 2 is a diagram of the data structure of an Authorization Rule 201. Each Authorization Rule 201 consists of four subelements: an Authorization Dataset 202, a Privacy Preference Rule 203, an Access List 204, and an Authorization Action 217. By expressing an Authorization Rule, a data subject defines a mapping from the first three subelements to a result action specified by the Authorization Action. In other words, an Authorization Rule declares that for a specified Authorization Dataset, the specified Privacy Preference Rule is applied for the specified Access List allow the specified Authorization Action.

The Authorization Dataset in a rule contains the data items that can be released according to the rule. Each authorization data set can be either a View Level 205 or a data type/object defined by a Class 209, a Property 210, an Instance 211, or a combination of these. A Class defines an object type (such as contact information), a Property defines a field within a Class (e.g. telephone number), and an Instance refers to a specific object (such as Joe's home-address). The combination of these may specify a data item constrained by all specified subelements. For example, specifying both class and property for a data item confines it to the property within the specified class. Moreover, a data subject can categorize his/her personal data into multiple View Levels (layers) so that the data in each View Level have the same privacy preference, access and authorization constraints, whereas data in different View Levels have different constraints. A View Level consists of a View Name 206, a Level Rank 208, and one or more Viewlevel Items 207. The View Name specifies which view this View Level belongs to, and the Level Rank declares which privacy level this View Level is confined with. The Level Rank can be used as a filter to retrieve the possible View Levels. Each Viewlevel item is further specified by a class, an instance, a property or a combination of them. Rules specified for a given View Level are inherited by View Levels of lower Level Ranks, unless overridden by rules specified by rules for the lower View Level, either for the entire level or for some class, instance, property or combination thereof of the dataset at the lower ranked View Level. By allowing the data subject to arrange all data into layers and associate privacy/access rules with each layer, the invention enables automated data exchange with considerable privacy protection for the data subject. All critical, highly personal data may be placed in one layer with very stringent privacy and access controls, while least sensitive data may be placed in a layer with the least amount of controls, with other data occupying intermediate layers. This, combined with the ability to associate rules with specific classes, instances, and properties of data gives the data subject a wide degree of flexibility in specifying different privacy and access controls for different categories of data, different types of requests, different classes of requesters, etc.

The Access List in a rule declares who can access the specified data set upon Privacy Preference matching. Each Access List contains one or more authorized Party 212, which can be a user 213, a group 214, a token 215, or "all" requesters 216. A user refers to a registered data requester, who has a userid and authentication data. A group contains multiple users, while one user may belong to multiple groups. A data subject can define one authorization rule for one or more groups of users who are then granted access to the data for the same privacy preference rules A token provides a way to allow controlled access to the data by limiting, for example, the number of times the data may be accessed. Any data requester in possession of the token is allowed access to the data as long as the token is valid. Moreover, a token may also be issued to a data requester to enable access to data that is held by a third party. The token is then presented by the data requester to the third-party which uses it to identify the requester as well as the data to which the requester is authorized. If the authorized party has the special value "all", then access is granted to all requesters of the data for whom the privacy preference rules match. In such cases, and anyone can access the data as long as the privacy policies of the requester match those of the data subject.

The Authorization Action 217 declares which one of the actions should be taken if this rule is matched. The action "grant" 218 means that the request should be granted if this rule is matched, the action "notify" 219 specifies that data subject should be notified when the request is granted, and the action "get consent" 220 specifies that special consent should be obtained before the request can be granted.

The Privacy Preference Rule in an Authorization Rule specifies the privacy preference and action control that the data users in the access list have to satisfy in order to access the data.

Figure 3:
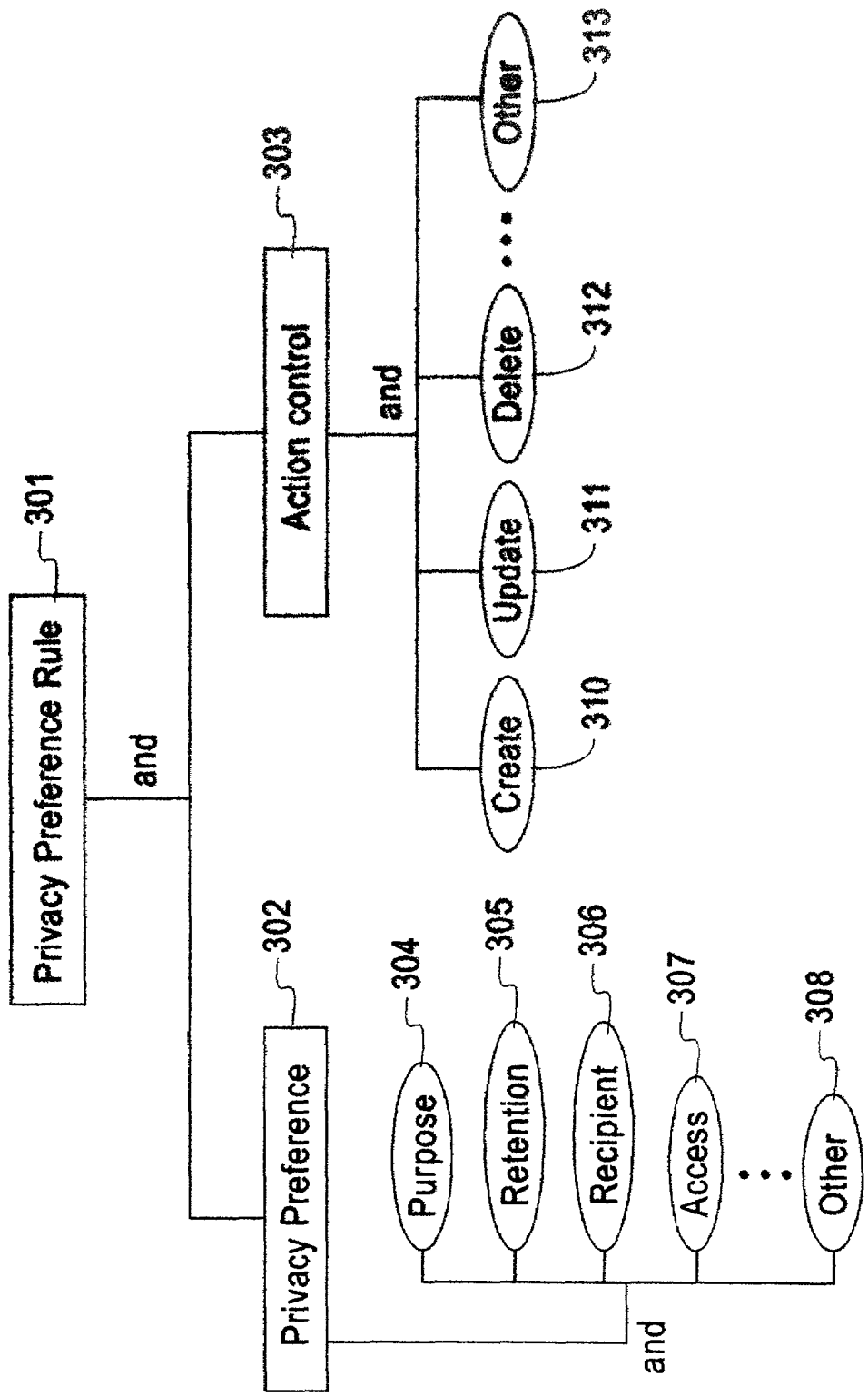
FIG. 3 is a block diagram of a privacy preference portion of the rule structure.

FIG. 3 is an expansion of the Privacy Preference Rule 203 in FIG. 2. It explains the data structure for specifying a Privacy Preference Rule for the data requesters in the Access List to access the data in the Authorization Dataset. The Privacy Preference Rule 301 in an Authorization Rule contains two declarations: data subject's privacy preferences and access actions allowed by the data subject. The Privacy Preference 302 specifies why and how the data can be accessed in terms of the P3P standards. It includes several statements: Purpose 304, Retention 305, Recipient 306, and Access 307. The system may define other statements 308 based on a specific application domain requirements.

Purpose specifies the purposes for which the data can be acquired and processed. According to P3P, there are 13 subelements allowed in declaring Purpose. The privacy policy can contain one or more of the following:

<current/>: completion and support of current activity
<admin/>: Website and system administration
<develop/>: research and development <customization/>: affirmative customization
<tailoring/>: one-time tailoring
<pseudo-analysis/>: pseudonymous analysis
<pseudo-decision/>: pseudonymous decision
<individual-analysis/>: individual analysis
<individual-decision/>: individual decision
<contact/>: contacting visitors for marketing of services or products
<historical/>: historical preservation
<telemarketing/>: telephone marketing
<other-purpose>string</other-purpose>

Since P3P was initially proposed for online personal information disclosure, one may need to add/delete/modify some sub-elements for the purpose of general privacy information control. Retention refers to the kind of retention policy applied to the data. According to P3P, there are 5 possible sub-elements in declaring Retention. The system may need to add/delete sub-elements for application purposes. A data subject can specify the retention using one of the following sub-elements.

<no-retention/>: information is not retained for more than a brief period of time
<stated-purpose/>: retained to meet the stated purpose
<legal-requirement/>: retained to meet a stated purpose but the destruction governed by legal requirements
<business-practices/>: retained in accordance with provider's business practices
<indefinitely/>: retained indefinitely Recipient specifies the legal entity, or domain, beyond the requester where the data may be distributed. There are 6 possible sub-elements. The system may need to add/delete sub-elements for application purposes. A data subject can specify the retention using one of the following sub-elements.

<ours/>: ourselves and our entities/agents
<delivery/>: delivery services possibly following different practices
<same/>: legal services following our practices (policy)
<other-recipient/>: legal services following different practices
<unrelated/>: unrelated third party
<public/>: public fora Access in the privacy preference describes whether the data in the corresponding authorization data set should be accessible by the data subject after the data has been released. Boolean values (true/false) are used to represent the access requirement flag. Different from the Purpose and Retention, Access declares the access capability that the requestor must provide to the data subject for his/her own data. Action control 303 specifies whether an access action is allowed. It contains several action permissions, each of which is represented by a boolean value. Action "create" 310 declares whether the data user can create the data, update 311 declares whether the data user can modify the data, and delete 312 declares whether the data user can delete the data. Additional actions 313 may be added according to application requirements.

Figure 4A:
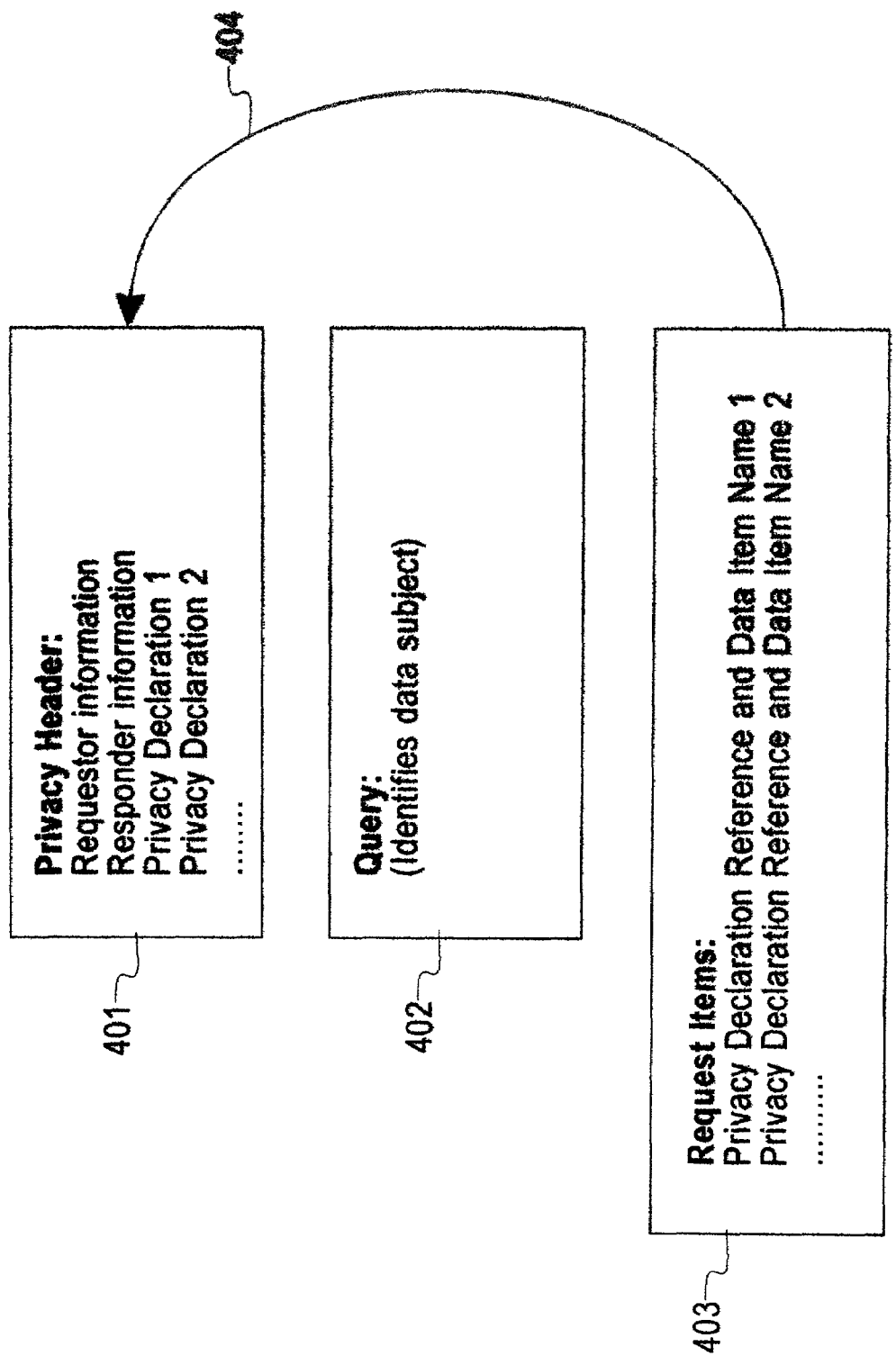
FIG. 4A is a block diagram of a data-request message structure.

FIG. 4a is a block diagram of a Data Request Structure. A request for data is sent from a Data Requester to the Profile Responder, and shown in FIG. 1. A data request identifies a data subject, and includes a request for specific items of data from the data subject. The data request also specifies how it will use the data in the request, in the form of privacy declarations.

A data request consists of three parts: a Privacy Header 401, a Query 402, and Request Items 403. A Privacy Header consists of the name of the requester, the name of the responder, and a list of privacy declarations. Each privacy declaration has the structure of a Privacy Preference, as described in FIG. 3. The Query consists of sufficient information to uniquely identify the data subject from whom the data is desired. When the query is applied to the Profile Database (FIG. 1), it retrieves a data subject.

The list of Request Items identifies the specific data items being requested. Each request item consists of two parts: a reference 404 to one of the privacy declarations in the Privacy Header 401 and the name of one or more data items. The meaning of this pairing is the following: for each requested data item, if the request recipient (data subject) supplies this data item to the requester, then the requester promises to enforce the associated privacy declaration for that data item. Alternatively, if the same privacy declaration applies to more than one data items, then a request item can consist of a single privacy declaration reference 404 and multiple data item names.

Figure 4B:
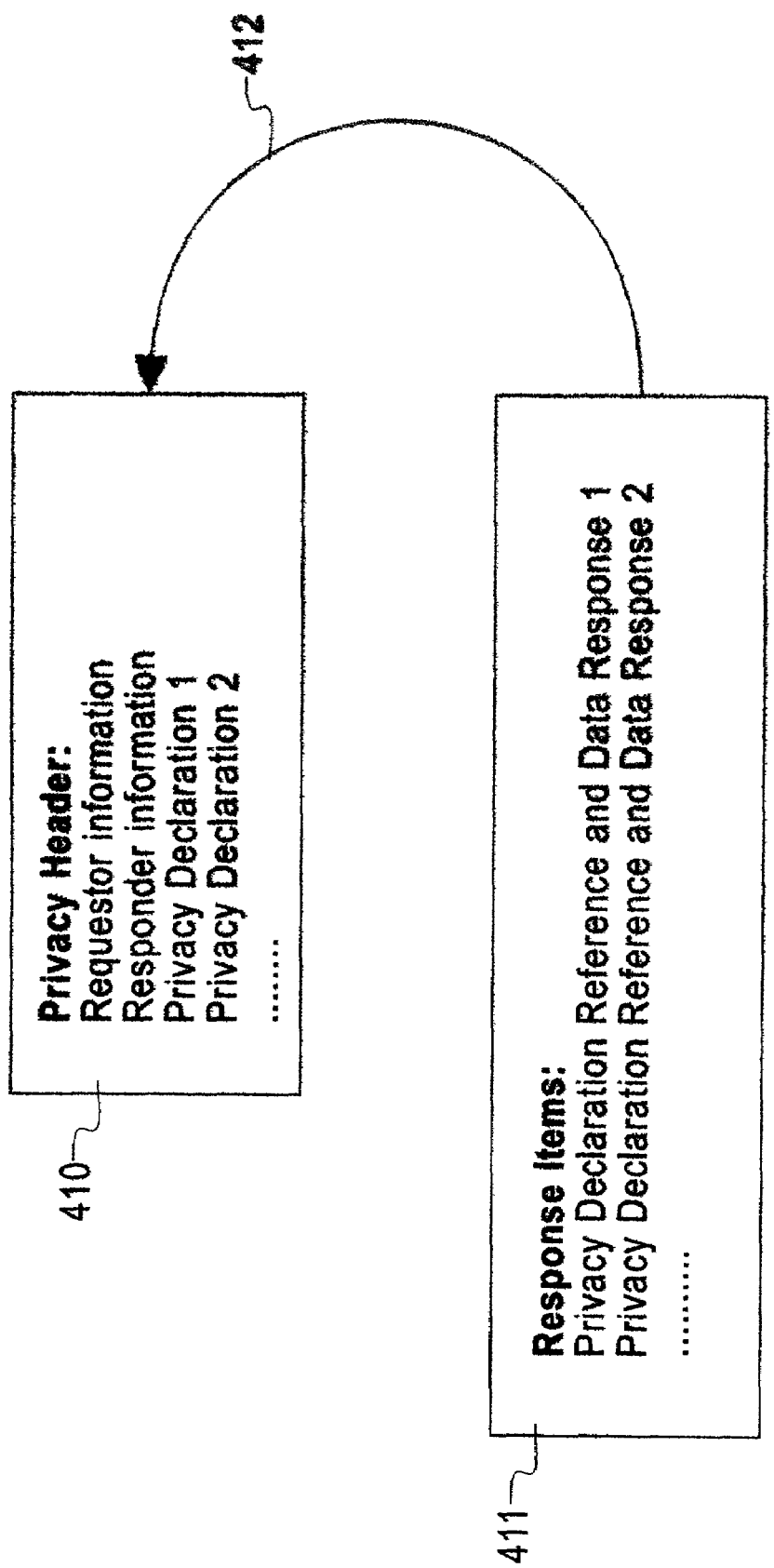
FIG. 4B is a block diagram of a data-response message structure

FIG. 4b is a block diagram of a Data Response Structure. A data response is sent from the Profile Responder of the system to the data requester, in response to a data request described in FIG. 4a. A data response is either a denial, if the request cannot be fulfilled, or the subset of specific data items which were requested and authorized, along with associated privacy declarations representing the data subject's privacy preferences. A data response consists of two parts: a Privacy Header 410 and Response Items 411. A Privacy Header consists of the name of the responder, the name of the requester, and a list of privacy declarations. Each privacy declaration has the structure of a Privacy Preference, as described in FIG. 3. The list of Response Items is empty if the request cannot be fulfilled, either because the data subject profile does not exist, data requester is not authorized to access the data, or the privacy declarations in the request header do not match the privacy preferences associated with the subject profile. If the request can be fulfilled by the response system, then the list of response item is not empty. Each response item consists of two parts: a reference 412 to one of the privacy declarations in the Privacy Header and a data response. A data response is a name-value pair from the profile of the data subject, corresponding to a requested data item. Alternatively, if the same privacy declaration applies to more than one profile data items, then a response item can consist of a single privacy declaration reference and multiple response items.

Figure 5:
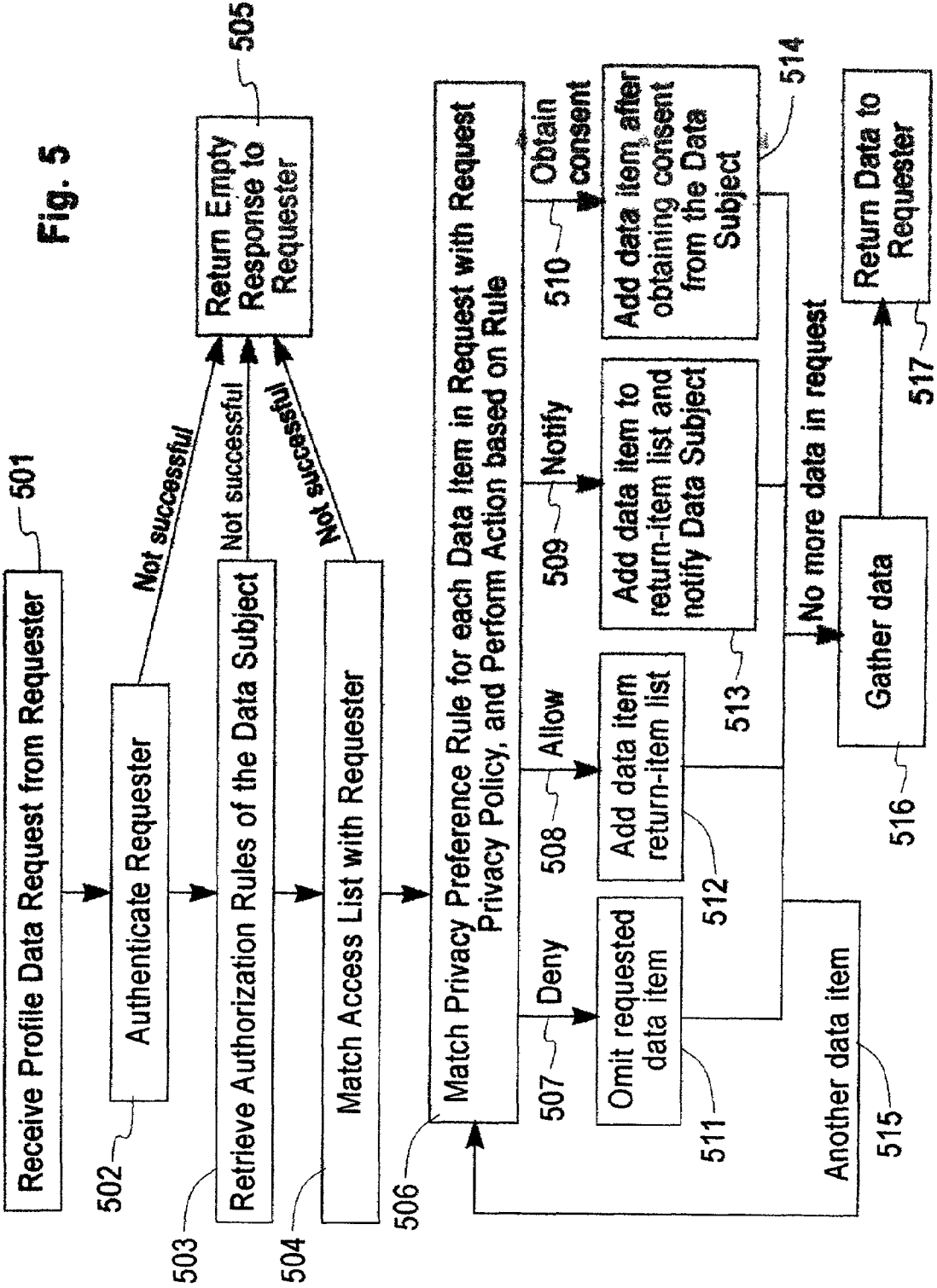
FIG. 5 is a flow chart of the request process.

FIG. 5 is a flow diagram of the Request Process, whereby the system receives a data request structure, processes it, and returns a data response structure to the requester. The Profile Responder receives the data request 501. The first step that the responder performs is to authenticate the requester 502. Authentication is the process of guaranteeing that the requester is who they say they are, and can be carried out in several ways, including the use of a userid and password, or a cookie, etc. If the authentication is not successful, then the response is returned with an empty response item list 505. If authentication succeeds, then the data request is passed to the Policy Authorization Engine which retrieves all Authorization Rules of the data subject specified in the request 503. The data subject is identified from the query in the request, which is applied to the profile database. Once the data subject is identified, all of the authorization rules are retrieved for him/her from the policy database. If there are no authorization rules for the data subject, the Profile Responder returns a response with an empty response item list. Otherwise, the next step is to examine the Access List of each of these retrieved authorization rules 504. For each access list, if the requester is not found in the access list, then the authorization rule is discarded. The requester is in the access list if the requester is either a user in the list or a user in a group which is in the list, or if the access list explicitly authorizes "all" requesters. After this process, if there are no authorization rules left, then the Profile Responder returns a response with an empty response item list. However, if any authorization rules still remain, the Policy Authorization Engine next compares the privacy declarations in the request with the Privacy Preference Rules in the authorization rules for each profile data item name in the request item 506. For each data item name in the query and in the request item list, the Policy Authorization Engine retrieves any privacy preferences from the authorization rules. It then performs the Policy-Preference matching process (see FIG. 6) for each data item. For each application of this matching process, the result is deny 507 or authorize 508, 509, or 510. If the result is deny, then the data item is not included in the list of data items to be returned in the response 511. If the result is authorized, then the data item is included in the response item list 512. Additionally, the authorization rule may require the data subject to be notified 513 or the consent of the data subject be obtained 514. After each data item name is processed, the next data item is retrieved for processing 515. When the entire request list has been processed, the data to be returned is gathered 516, the response structure is constructed and returned to the requester by the Profile Responder 517. If any of the data items have been denied, the Profile Responder may return an empty list to the requester, for more privacy security for the data subject.

Figure 6:
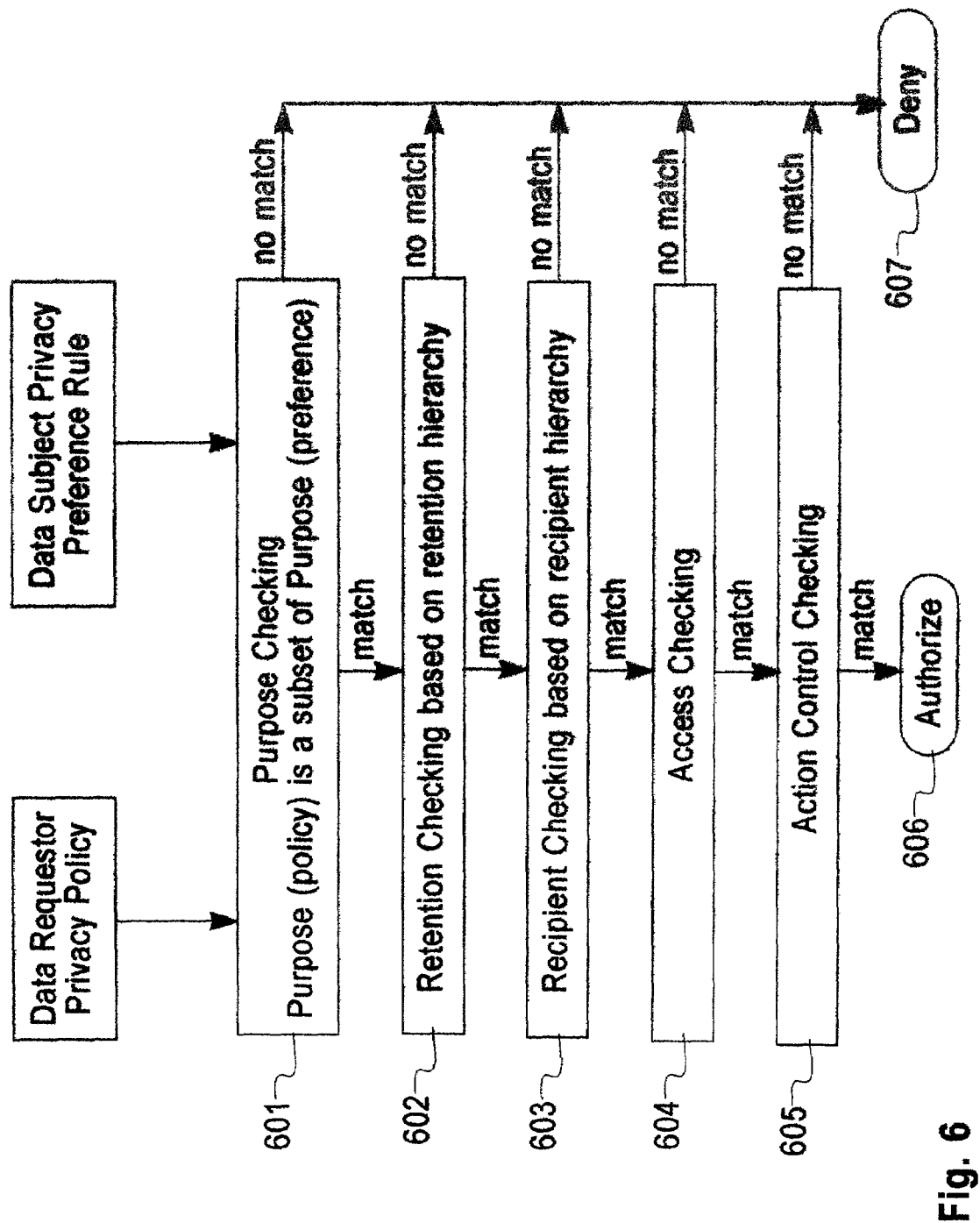
FIG. 6 is a flow chart of the data requester privacy, policy and data subject privacy preference rule matching process

FIG. 6 is a simple flow chart of the Data Requester Privacy Policy and Data Subject Privacy Preference Rule Matching process. The Privacy Preference Rule is specified by the Data Subject in the Authorization Rules as explained in FIG. 2 and FIG. 3, while the Data Requester's Privacy Policy is declared by the data requester as a part of the data request (FIG. 4a). Since both the privacy preference rule and the privacy policy are based on the P3P standard, the matching process is to check the matching for each element.

Purpose checking 601 checks the purpose privacy statements. Both the privacy policy as well as the privacy preference rule purposes may contain one or more subelements. If the subelements declared in the privacy policy is a subset of the subelements specified in data subject's privacy preference rule, the purpose checking is successful and the matching algorithm proceeds to the retention statement check 602.

The Retention statement can be declared by one of the five subelements: <no-retention/>, <stated-purpose/>, <legal-requirement/>, <business-practices/> and <indefinitely/>. These subelements express different privacy levels, some of them are more restricted than others. The subelement <no-retention/> has the most restrictive privacy level, and the subelement (<indefinitely/>) is the least restricted. <stated-purpose/> is more restricted than <legal-requirement/> and <business-practices/>, both of which are more restricted than <indefinitely/>. There is no order between <legal-requirement/> and <business-practices>. The retention statement check proceeds according to this particular order.

Recipient checking 603 then checks the matching for recipient statement. The recipient statement can be declared by one of the six subelements: <ours/>, <delivery>, <same/>, <other-recipient/>, <unrelated/>, and <public/>. These subelements express different privacy levels with <ours/> being the most restrictive, followed by <same/> and <delivery/>, then <other-recipient/> and <unrelated/>, with <public> being the least restrictive. The matching process is successful if the recipient declared in the privacy policy is not less restricted than the recipient specified in the privacy preference rule.

Access checking 604 checks the matching for the requirements of the capability for a data subject to access the data after a data requester acquires the data. The access checking is successful if the access requirement of the data subject is satisfied by the access statement declared in the policy. Finally, Action control checking 605 checks if the actions requested by the data requester are allowed according to the action control specified in data subject's privacy preference rule. If no action control is specified, read is assumed and allowed. This is done by simple checking the corresponding Boolean tag of a specific action in the preference. If all the checking is successful, the request is authorized 606, otherwise any failure along the matching process causes the request to be denied 607.

Figure 7:
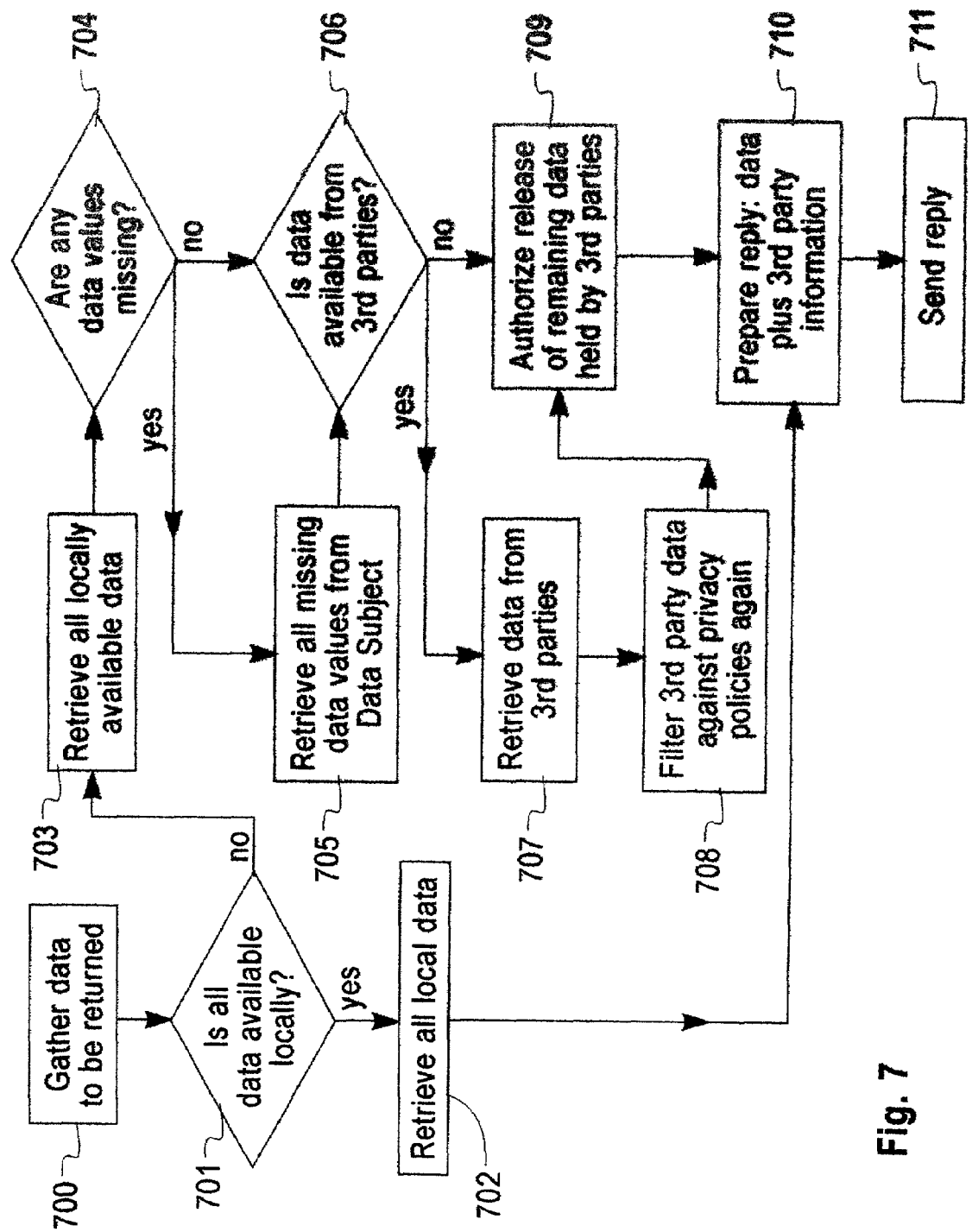
FIG. 7 is a flow chart of a gather and filtering process.

FIG. 7 is a flow diagram of a routine that enables a gather and filtering process carried out to collect data to be returned to a data requester. As described in FIG. 6, the process of matching the privacy policy of the data requester with the authorization rules specified for the requested data by the data subject results in a list of such data items that are to be returned to the data requester. This flow diagram described the various steps that could be potentially involved in the gathering of such data. In step 700, the system examines the list of data items to be returned. If all the data is available locally on the system 701, the system collects it 702, prepares the reply structure 710 and sends it to the data requester 711. If, however, all data is not available locally, then the system collects whatever data is locally available 703. It then checks if some of the data items have missing values 704. If yes, it contacts the data subject and retrieves the required data items from him/her 705. In step 706, the system determines if the data that is not available locally is available from third parties. If it is available, then the system retrieves the data from the third parties holding the data in step 707. It then filters the data again in step 708 by matching the data returned by the third parties with the request of the data requester and the privacy policies and authorization rules of the data subject. This ensures that only that data is returned that is allowed. In step 709, the system authorizes the release of any data that is held by third parties but is not available for release by the system itself (must be directly requested from the third parties by the data requester). The system then prepares a reply for the data requester 710 by collecting together all the data (locally collected or retrieved from third parties) as well as information about the data authorized to be released by third parties. It then sends this reply to the data requester 711. Thus, by enabling the gather and filter process, a data requester can get data held not only by the system locally but also held by third parties, either via collection by the system itself or directly from third parties after authorization by the system. Since the data subject provides authorization rules describing the privacy preferences and access permissions for all data that is held locally or by third parties, the process ensures that only that data is released, or authorized to be released, for which the data requester is authorized and for which the requesters privacy policies match that of the data subject.

Figure 8:
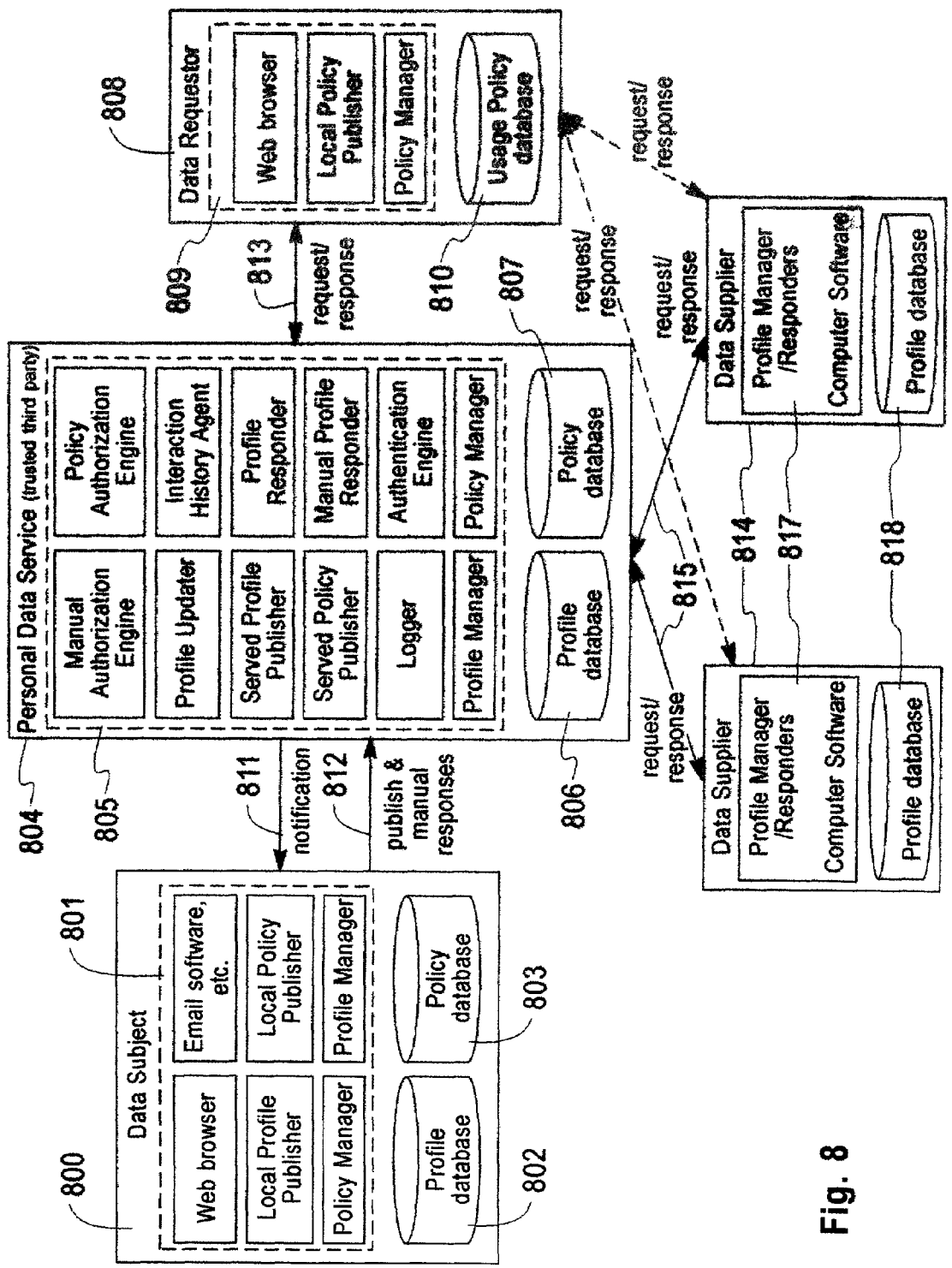
FIG. 8 is a block diagram of a method of doing business with the current invention wherein subject data is distributed across multiple enterprises, and a trusted third party is used as a data subject's personal data service to handle and process requests for data owned by the data subject as well as by the various enterprises (third party data suppliers).

FIG. 8 describes one method of doing business with the current invention wherein the subject data is distributed across multiple enterprises, and a trusted third party is used as a data subject's personal data service to handle and process requests for data owned by the data subject as well as by the various enterprises (third party data suppliers). In this method of doing business, a trusted third party acts as a Personal Data Service (PDS) 804 for the Data Subject 800, and provides a server-based, possibly distributed, environment for hosting the data that is owned by the data subject himself. The data subject may choose to store all such data in the PDS profile repository 806, or store some of it on his own personal machine profile repository 802. Similarly, the data subject may store his privacy policies entirely on the PDS policy repository 807, or distribute them between the PDS repository and his personal system policy repository 803. These policies may cover both data that is owned by the data subject and resides either on the PDS or on the data subject's personal system, as well as data that is owned by, and resides with, third party Data Suppliers 814 in their profile repositories 818. Additionally the PDS hosts all components 805 (described in FIG. 1) for creating and managing profiles, publishing privacy and authorization preferences, handling and responding to requests, authenticating requesters and privacy policy matching as well as releasing or authorizing release of data. Similarly, the data subject's personal system also hosts several software components 801, including local copies of the profile and policy publishers and managers to help publish and manage the data and policies that reside on the data subject's personal system, as well as e-mail and web browser software to help publish profiles and policies on the PDS, provide manual authorization and missing data responses 812 as well as handle notifications 811 from the PDS. A Data Requester 808 must also have a minimal set of software components 809 such as a local policy publisher and manager for the data requester's privacy policies stored in its policy repository 810. Finally, each Data Supplier 814 which owns and stores part of the data subject's data must also host some of the software components 817 for managing the data subject's data they store in their profile repository 818 as well as for handling data requests from, and sending responses to, the PDS. In this method of doing business, the PDS acts as an agent of the Data Subject. A Data Subject would register with the PDS and store his Profile as well as Privacy Policies with the PDS. The Data Subject may choose to keep part of the Profile and Privacy policies on his own personal system as well. The profile and privacy policies stored with the PDS will include information on where missing information is available, either from the Data Subject's personal system or from third-party Data Suppliers. Similarly, Data Requesters would also be required to register with the PDS. A Data Requester desiring access to some data about a Data subject then sends a request 813 to the PDS identifying the Data Subject as well as the data requested, along with its own privacy policies on how the requested data would be used. Using the various software components 805, as described earlier in FIG. 1 and elsewhere, the PDS then authenticates the requester and matches the privacy policies of the requester with the authorization rules/privacy preference rules specified by the Data Subject. If manual authorization is needed for some data, the PDS requests such authorization 811 from the Data subject. Once the policy matching and authorization process is completed, the PDS carries out a gather and filtering process, as described in FIG. 7, to collect the data to be returned to the Data Requester. The PDS collects all data that is locally available, and sends a request to the Data Subject to get any data that is available only from the personal system of the Data Subject. If any requested data is available from third-party Data suppliers, 814, the PDS sends requests 815 for such data to the Data Suppliers. The profile responder 817 run by a data supplier handles such requests from the PDS, and sends the data back to the PDS. Alternatively, the PDS just sends the Data Supplier an authorization to release the data directly to the Data Requester when so requested. Once all the data has been collected, or authorized to be released, the PDS sends it to the Data Requester along with information about any third party data suppliers to contact for remaining data. The Data Requester may then get this data directly from the Data Suppliers.

This method of doing business has several features of benefit to all the parties involved. The PDS acts as a trusted agent for the Data Subject, and relieves the subject of the responsibility of hosting the data and policies as well as handling and processing requests of data from Data Requesters. Moreover, it can function as a fully automatic system, requiring no intervention by the data subject once the profile and privacy policies have been set, in most circumstances. From a Data Requester's point of view, this method is beneficial as well since it has to send one request for data to the PDS to get data that is owned by the Data Subject as well as by other Data Suppliers. Finally, this method provides an independent service provider the ability to act as a PDS, and provide the server platform and hosting service as a fee-based service for Data Requesters and Data Subjects.

Figure 9B:
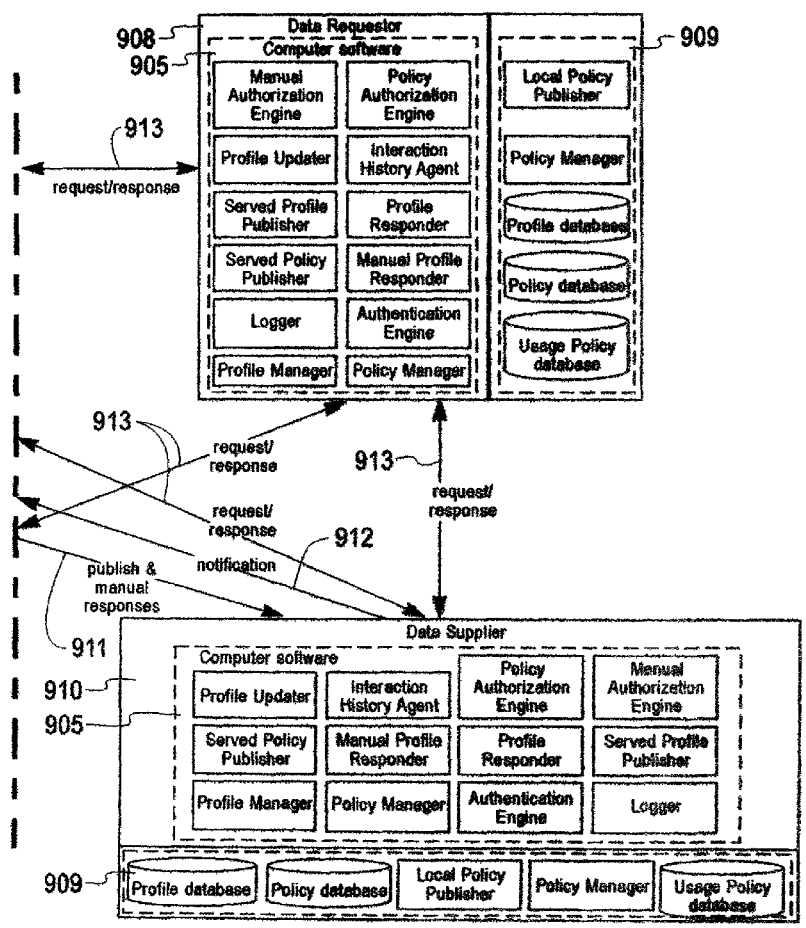
FIG. 9 is a block diagram of a method of doing business with the current invention wherein subject data is distributed across multiple enterprises, with each enterprise holding enterprise-specific data and privacy preferences of the data subject, and accepting and processing requests for data held by it directly from interested data requesters where an optional trusted third party may be used as data subject's personal data service to handle requests for data that is owned by the data subject.

FIG. 9 describes a method of doing business with the current invention wherein subject data is distributed across multiple enterprises, with each enterprise holding enterprise-specific data and privacy preferences of the data subject, and accepting and processing requests for data held by it directly from interested data requesters. In this method of doing business, every enterprise that holds any data belonging to the Data Subject 900 runs all privacy-software components 905 (described in FIG. 1) for creating and managing privacy and authorization preferences, handling and responding to requests, authenticating requesters, performing privacy policy matching as well as releasing data. These include all third-party Data Suppliers 910 as well as Data Requesters 908, the two being interchangeable in that any enterprise can be a requester of data, or a supplier of data, at different times. Additionally, each such enterprise has several other components 909, including a repository of its own privacy policies describing how it uses any requested data along with a local policy publisher and manager for managing such policies, as well as a repository of Data Subject's privacy policies governing the release of the Data Subject's data that is owned and held by the enterprise. Each enterprise is thus responsible for storing a Data subject's privacy policies as well as handling and processing any requests made for such data by any Data Requesters. A Data Subject publishes 911 his privacy preference policies directly with each potential enterprise that holds any data on the Data Subject. A Data Requester 908 too directly sends its data request 913, along with its privacy policy, to the Data Supplier which holds the requested data. The Data Supplier 910 then uses the various privacy-software components 905, as described in FIG. 1, to authenticate the requester and match the privacy policies of the Data Requester with those specified by the Data Subject (and stored in the Supplier's policy repository) to decide whether to release the data. If manual authorization or some missing values are needed for some data, the Data Supplier requests such authorization 912 from the Data Subject. To enable the Data Subject to publish his privacy policies as well as respond to such requests from the Data Suppliers, his personal system also hosts several software components 901, such e-mail and web browser. Finally, the Data Subject may still choose to use a trusted third-party as his Personal Data Service (PDS) 904 to manage access to personal data that is owned by the Data Subject. As in the case of the enterprises that hold any of the Data Subject's data, the PDS runs all the privacy-software components 905 to help it receive and process requests for the data owned by the Data subject, as well as a repository of such data 906 and privacy-preferences governing access to such data 907. Also, the Data Subject may choose to keep some of the data, as well as policies, on repositories 902 and 903 on his personal system, along with privacy-software components to manage them 901. A Data Requester who needs data that is owned and held by the Data subject would then send such a request 913 to the PDS, which would process the request and respond with the data, with optional contact 911/912 with the Data Subject's system. This method of doing business has several features of benefit to all the parties involved. Since every enterprise runs the various privacy-software components, and stores the Data Subject's privacy preferences governing the data owned/stored by the enterprise, it is easy for enterprises to maintain and share data amongst them, according to the privacy preferences of the Data Subject. Moreover, it also enables enterprises to show the Data Subject's the data they have about him. Finally, the Data Subject can still choose to use a PDS to act as his trusted agent for hosting the data that he owns as well as handling and processing requests for that data from Data Requesters.

While the invention has been shown and described with reference to particular embodiments thereof, it will be understood by those skilled in the art that the foregoing and other changes in form and detail may be made herein without departing from the spirit and scope of the invention. The appended claims are to encompass within their scope all such changes and modifications as are within the true spirit and scope of this invention.

We claim:

1. A method to enforce privacy preferences on exchanges of personal data of a data-subject, comprising the steps of:
    specifying one or more data-subject authorization rule sets, the data-subject authorization rule set having one or more subject constraints on one or more data-subject data;
    receiving a request message from a requester, the request message having one or more requests for one or more of the data-subject data pertaining to the a subject, and a requester privacy statement for each of the respective data-subject data requested, wherein the requester privacy statement includes purpose, retention, recipient, and access information, wherein the purpose information specifies the purpose for which the requested data is acquired, the retention information specifies a retention policy for the requested data, the recipient information specifies the recipients of the requested data, and the access information specifies whether the requested data should be accessible to the data-subject after the data has been released;
    comparing the requester privacy statement to the subject constraints; and
    releasing the data-subject data in a response message to the requester only if the subject constraints are satisfied.

2. The method of claim 1, further comprising the step of authorizing the requester to receive the data-subject data.

3. The method of claim 2, wherein the step of authorizing the requester includes the steps of authorization at more than one level.

4. The method of claim 1, wherein the step of specifying one or more data-subject authorization rule sets, the data-subject authorization rule set having one or more subject constraints includes the steps of:
    specifying an authorization dataset describing the data to which the constraint applies; specifying a privacy preference rule that describes the privacy preferences under which the data-subject data may be released and the corresponding actions allowed;
    specifying an access list describing who is allowed to access the said data; and
    specifying an authorization action that describes any additional action to be taken if the restrictions imposed by the authorization dataset, the privacy preference rule and the access list of this constraint are matched.

5. The method of claim 1, wherein the step of specifying one or more data-subject authorization rule sets, the data-subject authorization rule set having one or more subject constraints includes the steps of:
    specifying such constraints for subject data that owned and held by the subject;
    specifying such constraints for data-subject data that is owned by the data subject, but held by one or more parties on behalf of the subject; and
    specifying such constraints for data-subject data that is owned and held by one or more third parties.

6. The method of claim 1, wherein the step of specifying one or more data-subject authorization rule sets includes the steps of specifying different data-subject authorization rule sets for the same data-subject data for one or more requesters that must be satisfied for the data-subject data to be released.

7. The method of claim 1, wherein the step of comparing the requester privacy statement to the subject constraints includes the step of partitioning the data-subject data into a first part that satisfies the constraints and is released and a second part that does not satisfy the constraints and is not released.

8. The method of claim 1, wherein the step of releasing the data-subject data includes the step of getting manual authorization from the data-subject for some of the data-subject data before releasing the data.

9. The method of claim 1, wherein the step of releasing the data-subject data includes the step of getting one or more missing values from the data-subject before releasing the data.

10. The method of claim 1, wherein the step of releasing the data-subject data includes the step of getting one or more data-subject data from one or more third parties, that store that data-subject data, before releasing the data.

11. The method of claim 1, wherein the step of releasing the data includes the step of providing authorization to one or more third parties holding part of the data-subject data to release the part to the requester.

12. The method of claim 1, wherein the step of specifying one or more data-subject authorization rule sets, the data-subject authorization rule set having one or more subject constraints includes the steps of:
    ordering the data-subject data in a hierarchy with one or more levels; and
    specifying one or more constraints for each level that apply to the data-subject data in that level.

13. The method of claim 1, wherein the step of specifying each subject constraint includes the step of specifying one or more of the following: one or more classes of data, one or more properties of data, and one or more instances of data.

14. The method of claim 12, wherein the step of specifying constraints for each level includes the step of specifying different constraints for one or more of the levels.

15. The method of claim 12, wherein the step of specifying constraints for each level includes the step of inheriting the constraints from one or more other levels.

16. The method of claim 12, wherein the step of ordering the data-subject data into a hierarchy of levels includes the step of creating levels from one or more classes of data, properties of data, instances of data, or a combination thereof these.

17. The method of claim 1, wherein the step of specifying one or more data-subject authorization rule sets, the data-subject authorization rule set having one or more subject constraints includes the steps of specifying constraints that include privacy preferences based on any one or more of a Platform for Privacy Preferences (P3P) standard privacy statements.

18. A method, as in claim 17 where the standard privacy statements include any one or more of the following: a purpose, a retention, a recipient and an access.

19. The method of claim 1, wherein the step of specifying one or more data-subject authorization rule sets, the data-subject authorization rule set having one or more subject constraints includes the steps of specifying constraints over subject data that includes any one or more of the following: a privacy data, a privacy data associated a natural person, a confidential information, and a trade secret.

* * * * *